United States Patent
Wan

(10) Patent No.: US 6,385,460 B1
(45) Date of Patent: May 7, 2002

(54) POWER MANAGEMENT SYSTEM FOR A MOBILE UNIT BY REDUCED NEIGHBOR CELL SCANNING

(75) Inventor: Yongbing Wan, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/084,534

(22) Filed: May 26, 1998

(51) Int. Cl.[7] .............................. H04B 7/00; H04Q 7/20
(52) U.S. Cl. ....................... 455/515; 455/434; 455/436; 455/441; 455/574; 455/67.1
(58) Field of Search ................................. 455/441, 422, 455/425, 432, 436, 437, 440, 525, 513, 514, 434, 38.3, 522, 574, 509, 515, 516

(56) References Cited

U.S. PATENT DOCUMENTS

| | | | |
|---|---|---|---|
| 5,239,667 A | * 8/1993 | Kanai | 455/10 |
| 5,396,253 A | * 3/1995 | Chia | 342/104 |
| 5,432,842 A | * 7/1995 | Kinoshita et al. | 455/440 |
| 5,539,748 A | 7/1996 | Raith | 370/329 |
| 5,548,806 A | * 8/1996 | Yamaguchi et al. | 455/441 |
| 5,678,185 A | * 10/1997 | Chia | 455/437 |
| 5,913,168 A | * 6/1999 | Moreau et al. | 455/441 |
| 6,064,890 A | * 5/2000 | Hirose et al. | 455/513 |
| 6,067,460 A | * 5/2000 | Alanara et al. | 455/574 |
| 6,108,545 A | * 8/2000 | Keshavachar | 455/436 |
| 6,208,861 B1 | * 3/2001 | Suzuki | 455/441 |
| 6,292,660 B1 | * 9/2001 | Hartless et al. | 455/434 |

FOREIGN PATENT DOCUMENTS

GB 2 305 825 4/1997

OTHER PUBLICATIONS

Copy of International Search Report from corresponding PCT Application No. PCT/US9909901 dated Sep. 14, 1999.
Sigmund M. Redl et al., "An Introduction to GSM", pp. 19–105.

* cited by examiner

Primary Examiner—Dwayne Bost
Assistant Examiner—Temica M. Davis
(74) Attorney, Agent, or Firm—Knobbe, Martens, Olson & Bear LLP

(57) ABSTRACT

A power management system for a mobile unit wherein the frequency of scanning a neighboring cell may be controlled. A mobile unit consumes power in standby mode by periodically scanning the base station in each neighboring cell to determine which base stations are providing a usable signal. When the signal provided by the mobile unit's servicing base station diminishes, the mobile unit informs the cellular network of the base stations providing usable signals to assist in the handover. By detecting the rate of change of the signal strength received from a base station, the mobile unit may change the scanning rate of each neighboring cell. Alternatively, the mobile unit can estimate the relative speed it is traveling through a cell. If traveling slowly through the cell or if the signal strength is not changing over time, the need for a rapid handover diminishes. The mobile unit may also increase the scanning rate if traveling rapidly through the cell.

7 Claims, 8 Drawing Sheets

MOBILE UNIT

POWER MANAGEMENT SYSTEM FOR A MOBILE UNIT BY REDUCED NEIGHBOR CELL SCANNING

BACKGROUND

1. Field of the Invention

This invention relates to the field of wireless communication systems. More specifically, the invention relates to power management systems for mobile units.

2. Description of the Related Art

The use of wireless communication systems is growing with users now numbering well into the millions. However, one inconvenience associated with routine use of a mobile unit is the constant need to recharge and replace depleted batteries. Even users who make and receive a few telephone calls such that their mobile units operate mostly in a standby mode (awaiting calls) experience the annoying and frequent problem of depleted battery power.

As a mobile unit travels through a cellular network, the mobile unit moves through service areas known as cells. Each cell is a specific geographic region containing a base station. When moving from one cell to another, the base station servicing the mobile unit changes from the base station of one cell to the base station of another cell. In many analog cellular systems, this change is controlled by the base stations and the switch is called "handoff." However, in conventional digital cellular systems, the mobile unit assists in determining when the serving base station should be changed, and the switch is termed "handover."

In digital cellular systems, the mobile unit does not have to be served by the nearest base station. From signal strength measurements, the mobile unit can determine which base stations are providing signals capable of adequately servicing the mobile unit. This information is then sent to a mobile switching center to determine which base station will serve the mobile unit. Due to loading requirements, it may be advantageous for a more remote base station to serve the mobile unit, provided the received signal strength from the remote base station is adequate.

A large portion of battery power consumed in common standby modes is attributable to determining proper handover. While in the standby mode, the mobile unit is periodically activated to scan the signal strength of each neighboring cell. For example, in the Global System for Mobile Communications (GSM) wireless communication networks, a mobile unit receives and decodes the signal strength of each neighboring cell about once every thirty seconds.

At any given time, a mobile unit may have between 6 to 12 neighboring cells. Because of the requirement to scan each cell approximately every 30 seconds, the mobile unit may be activated every 2–5 seconds. Each activation and scan consumes a significant amount of battery power, thereby reducing the standby time of the mobile unit.

Improvements in battery technology, while helpful, have done little to avoid the seemingly ever-present need to recharge and replace mobile unit batteries. What is needed is a system to conserve battery power by minimizing the power consumed scanning neighboring cells.

SUMMARY

The present invention reduces power consumed by a mobile unit in the standby mode by reducing the frequency the mobile unit scans neighboring cells to determine signal strength. Reduced scanning of neighboring cells consumes less power and advantageously increases the standby mode lifetime of a mobile unit battery.

For example, scanning each neighboring cell every 30 seconds ensures a mobile unit traveling through a cell knows which base stations are providing usable signals. In this manner, when the mobile unit crosses a cell boundary, or loses the required signal strength from its servicing base station, the mobile switching center can handover the mobile unit to a new base station.

Generally, a handover occurs when a mobile unit exceeds the range of its servicing base station. Therefore, if a mobile unit is stationary, or moving at a slow rate of speed, there is less need to monitor the neighboring base stations.

One embodiment of the invention detects the speed the mobile unit is moving and adjusts the frequency of scanning each neighboring cell accordingly. For example, if a mobile unit is moving slowly through a cell, the time period between scanning for each neighboring cell can be increased.

The speed of the movement through a cell may be determined by the change in signal strength. Every time a mobile unit communicates with the base station, the received signal strength is measured. If a mobile unit is not moving through the cell, the signal strength should remain fairly constant. However, as the mobile unit moves away from the base station, the signal strength decreases.

One embodiment of the invention determines the rate of change in the measured signal strength of the mobile unit. If the rate of change is low, the mobile unit increases the amount of time between each scan of a neighboring cell.

One embodiment of the invention is a wireless communication system comprising a plurality of base stations which transmit signals and a mobile unit which intermittently detects the signals transmitted by the plurality of base stations. A signal strength detector then determines the quality of the signals received by the mobile unit, and a processor calculates the speed at which the mobile unit is moving from one of the plurality of base stations based on the rate of change of the quality of the signals received by the mobile unit. The processor adjusts the frequency in which the mobile unit detects the signals transmitted by at least one of the plurality of base stations based upon the speed of the mobile unit.

One embodiment of the invention is a method of conserving power in a wireless communication system. The method comprises the acts of measuring the quality of a plurality of signals received from one of a plurality of base stations and then calculating the speed of a mobile unit from the signal quality measurements. The mobile unit then adjusts the frequency the signals are detected based upon the speed of the mobile unit.

In one embodiment of the invention, a wireless communication system comprises a speed sensor which determines the speed of a mobile unit based upon the rate of change of the strength of signals received by a mobile unit. A scan inhibitor causes the mobile unit to inhibit,detection of at least one message from a base station when the speed of the mobile unit is below a set level.

One embodiment of the invention is a method of saving power in a communications system. The method comprises the acts of determining the speed of a receiving unit and altering a periodic interval for detecting a transmission based upon the speed of the receiving unit.

In one embodiment of the invention, a wireless communication system comprises means for determining a change over time of a signal and means for adjusting the rate of detecting the signal based upon the change over time.

One embodiment of the invention is a method of saving power in a communications system. The method comprises the acts of measuring signal changes as a function of time and then altering a periodic interval for detecting a transmission based upon the measured signal changes.

BRIEF DESCRIPTION OF THE DRAWINGS

These and other features and advantages of the invention will become more apparent upon reading the following detailed description and upon reference to the accompanying drawings.

DETAILED DESCRIPTION

Figure 1:
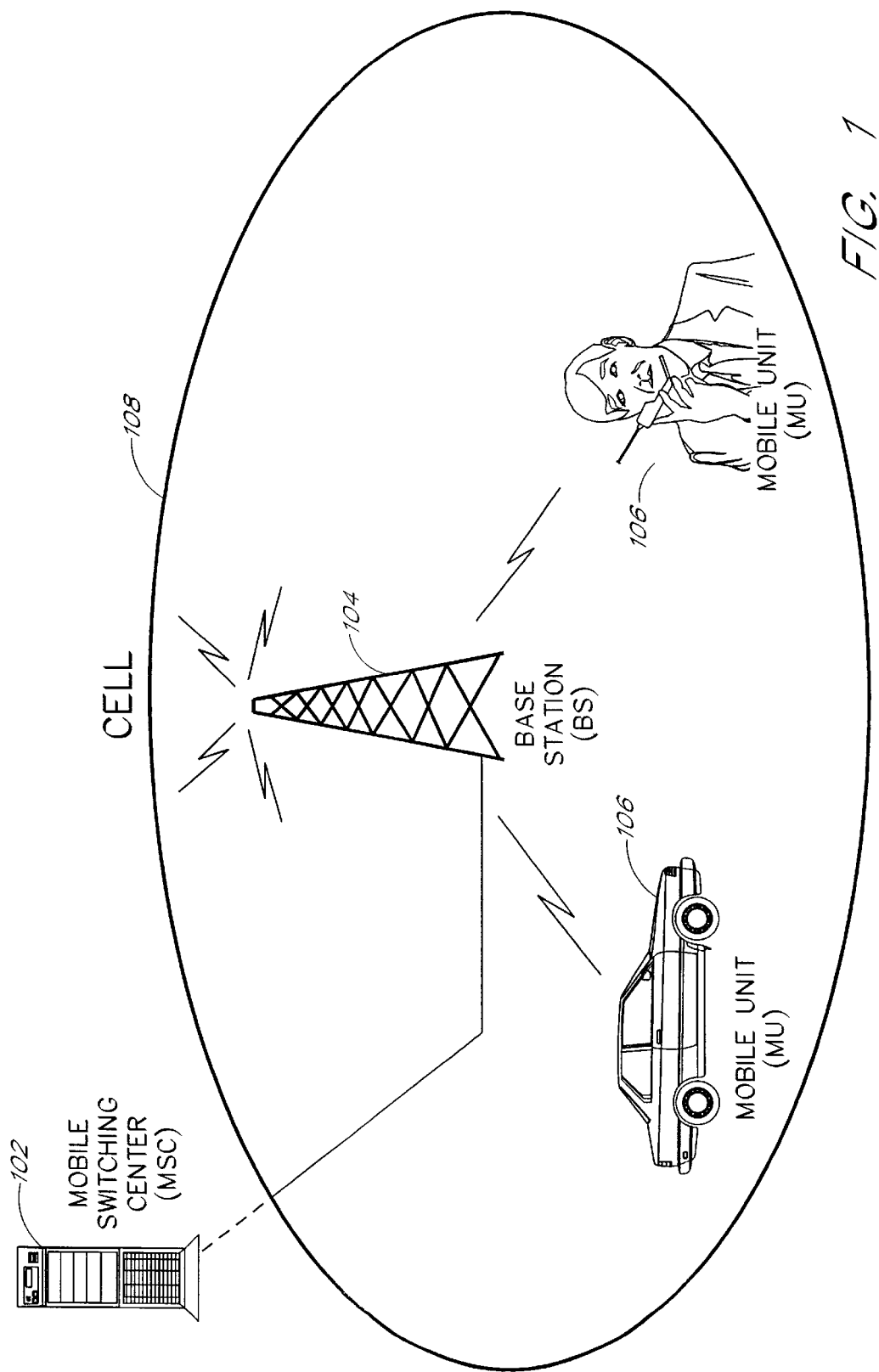
FIG. 1 illustrates components of a wireless communication system appropriate for use with an embodiment of the invention.

FIG. 1 illustrates components of a wireless communication system. A mobile switching center 102 communicates with a base station 104. The base station 104 broadcasts data to and receives data from mobile units 106 within a cell 108. The cell 108 is a geographic region, roughly hexagonal, having a radius of up to 35 kilometers or possibly more.

The mobile unit 106 is capable of receiving data from and transmitting data to a base station 104 in compliance with the Global System for Mobile communications (GSM). GSM is a communication standard permitting mobile users of wireless communication devices to exchange data over a telephone system wherein radio signals carry data to and from the wireless devices. Under the GSM standard, additional cells adjacent to the cell 108 permit mobile units 106 to cross cell boundaries without interrupting communications. This is because base stations 104 in adjacent cells assume the task of transmitting and receiving data for the mobile units 106. The mobile switching center 102 coordinates all communication to and from mobile units 106 in a multi-cell region, thus the mobile switching center 102 may communicate with many base stations 104.

The mobile units 106 may move about freely within the cell 108 while communicating either voice or data. The mobile units 106 not in active communication with other telephone system users may, nevertheless, scan base station 104 transmissions in the cell 108 to detect any telephone calls or paging messages directed to the mobile unit 106.

One example of such a mobile unit 106 is a cellular telephone used by a pedestrian who, expecting a telephone call, powers on the cellular telephone while walking in the cell 108. The cellular telephone synchronizes communication with the base station 104. The cellular telephone then registers with the mobile switching center 102 to make itself known as an active user within the GSM network.

As discussed in further detail below, the mobile unit 106 scans data frames broadcast by the base station 104 to detect any telephone calls or paging messages directed to the cellular telephone. In this call detection mode, the mobile unit 106 receives, stores and examines paging message data, and determines whether the data contains an identifier matching an identifier of the mobile unit 106. If a match is detected, the mobile unit 106 establishes a call with the mobile switching center 102 via the base station 104. If no match is detected, the mobile unit 106 enters an idle state for a predetermined period of time, then exits the idle state to receive another transmission of paging message data.

A common implementation of the GSM system uses frequencies in the 900 megahertz (MHz) range. In particular, mobile units 106 transmit in the 890–915 MHz range and base stations 104 transmit in the higher 935–960 MHz range. Each 25 MHz range is divided into 125 radio frequency channels, each having a width of 200 kilohertz (kHz). The direction of communication from a mobile unit 106 to a base station 104 is referred to as uplink, and the direction from a base station 104 to a mobile unit 106 is referred to as downlink.

Figure 2:
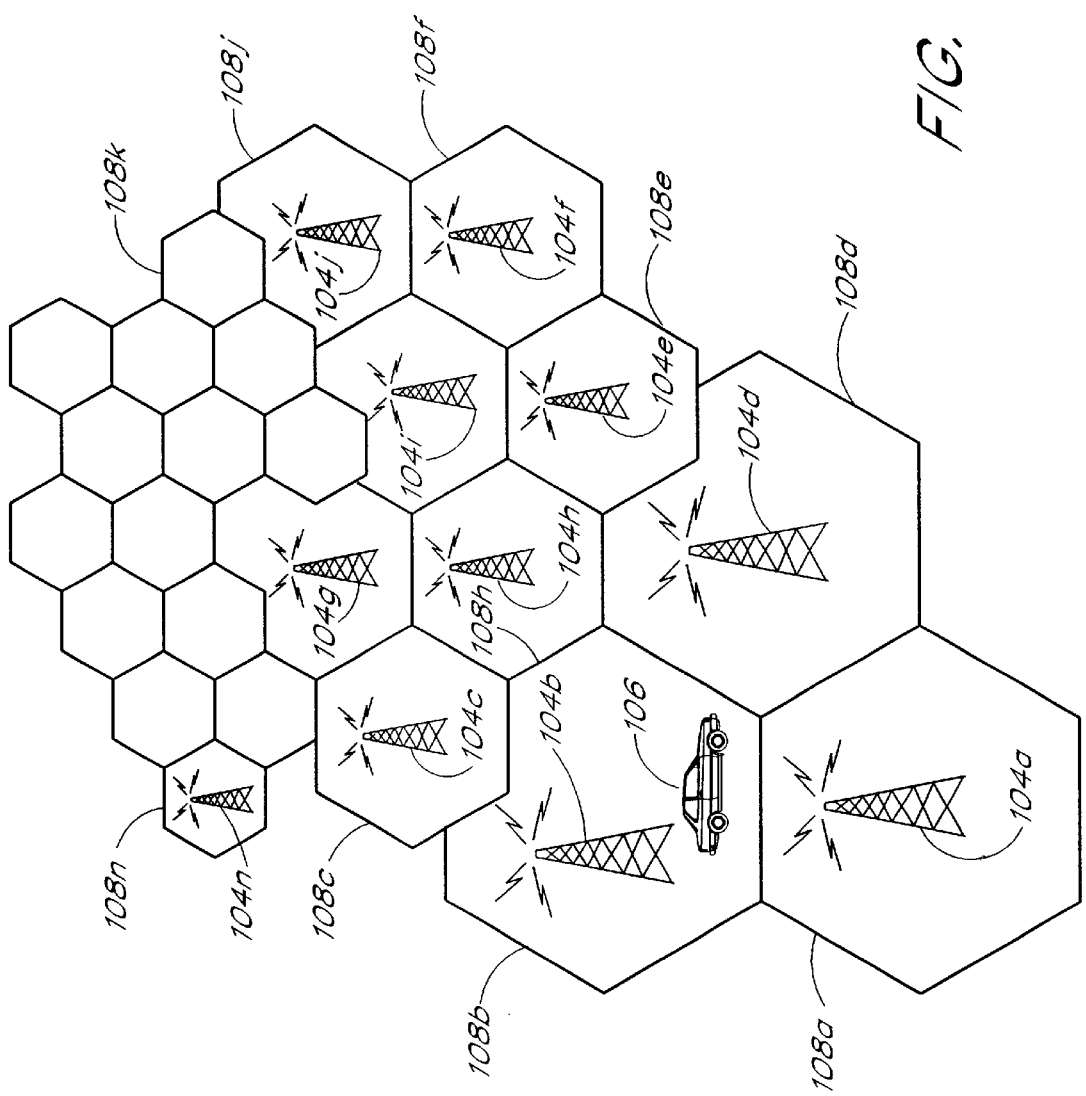
FIG. 2 illustrates a series of cells in a wireless communication system.

FIG. 2 illustrates one example of a series of cells 108a–108n in a wireless communication system. The cells 108a–108n are generally hexagonal, although they may be other shapes including circular, square, oval, oblong, or any other polygon. The size of each cell 108a–108n may vary depending on location. For example, in densely packed urban areas, a cell 108k may be small but in a more rural area the size of a cell 108a increases. Each of the cells 108a–108n has a corresponding base station 104a–104n.

In FIG. 2, the mobile unit 106 is located in the cell 108b. While the mobile unit 106 is in cell 108b, it is likely being served by the base station 104b, although due to loading and other requirements, it may be served by any base station 104 providing a useable signal. While in one cell 108, the mobile unit 106 periodically checks the signal strength of the base stations 104 in each neighboring cell 108. For example, while the mobile unit 106 is in the cell 108b, the mobile unit 106 monitors the signal strength of base stations 104a, 104c, 104d, and 104h. If the mobile station 106 travels into cell 108h, the mobile switching center 102 may cause the mobile station 106 to handover to base station 104h. In this circumstance, the mobile station 106 then periodically monitors the signal strength of base stations 104b, 104c, 104d, 104e, 104g, and 104i.

Scanning each neighbor cell to check the signal strength consumes power. Millions of consumers use mobile units 106, such as portable, hand-held cellular telephones, that rely on batteries for power. Even consumers who initiate and receive relatively few telephone calls on their cellular telephones must frequently recharge and replace batteries because of the power consumed by the cellular telephone while in standby operation (waiting for an incoming call).

The present invention substantially reduces the power consumed by the mobile unit 106 in scanning neighbor cells and consequently increases battery lifetime. To reduce power consumption, one embodiment of the invention does not scan each neighbor cell at the rate prescribed by the base station 104. Rather, the mobile unit 106 detects the signal quality and if the quality is sufficient, skips a number of scanning cycles. Advantageously, the embodiment substantially reduces neighbor cell scanning and extends the lifetime of a single battery charge.

Figure 3:
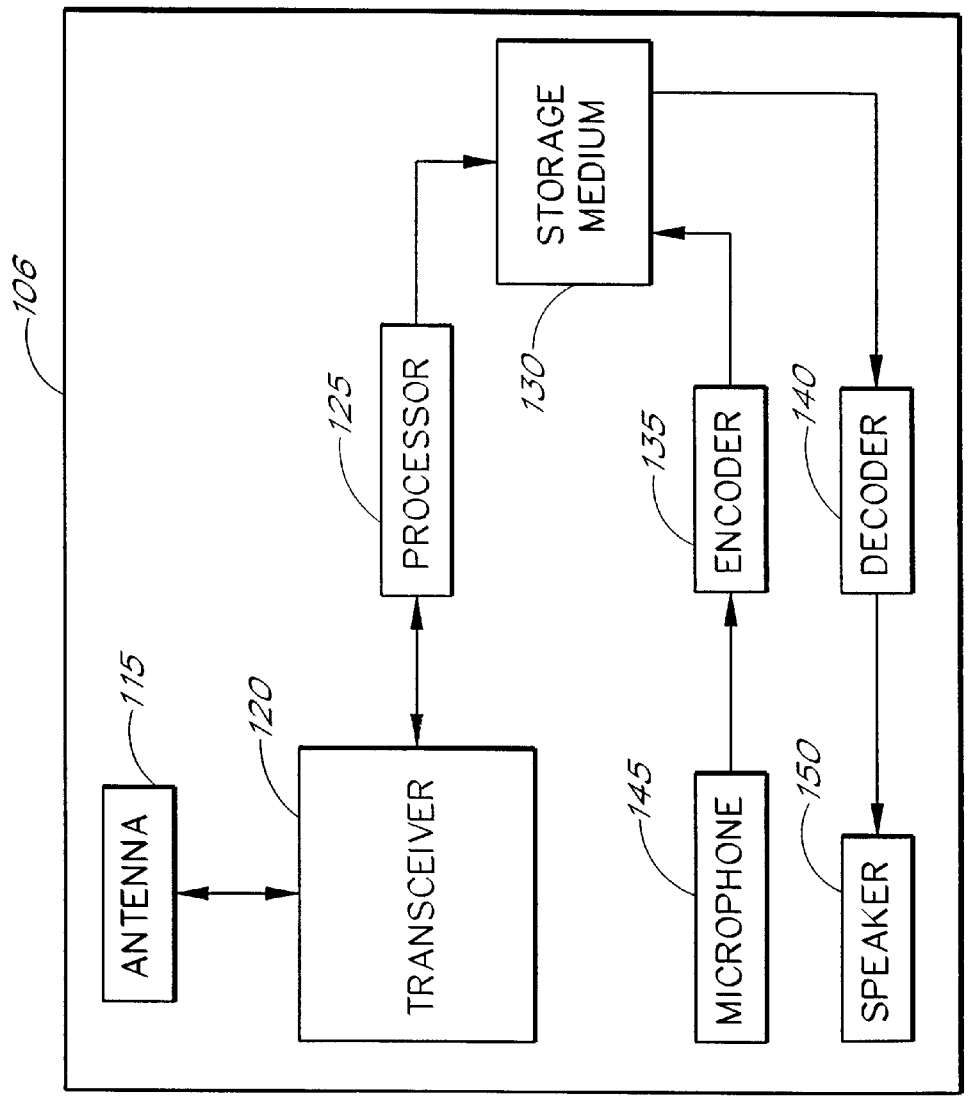
FIG. 3 illustrates a block diagram of a mobile unit according to one embodiment of the invention.

FIG. 3 illustrates one embodiment of the mobile unit 106. The mobile unit 106 downlinks the signals from the base station 104 at a transceiver 120 via an antenna 115. The transceiver 120 may also uplink information to the base station 104. Alternatively, a separate receiver and transmitter may be used in place of the transceiver 120. After receiving the signals, the transceiver 120 relays the signals to a processor 125. In one embodiment, a microprocessor performs the function of the processor 125. Of course, other types of processors may be used including conventional general purpose single- or multi-chip microprocessors, digital signal processors, embedded microprocessors, microcontrollers and the like.

The processor 125 converts the signals into data and performs the functions requested by the signal. This may include an indication that a call is pending. The mobile unit 106 may inform the user of a pending call by a variety of methods, including ringing, vibrating or flashing lights. During the pendency of a call, the data transmitted and received by the mobile unit 106 may include voice and data.

The data created by the processor 125 may be temporarily or permanently stored in a storage medium 130. The storage medium 130 may comprise any method of storing information. For example, the storage medium 130 may comprise an electrically erasable programmable read-only memory (EEPROM), read-only memory (ROM), random access memory (RAM), hard disks, floppy disks, laser disc players, digital video devices, compact discs, video tapes, audio tapes, magnetic recording tracks, and other techniques to store data.

The data from the storage medium 130 may be transmitted through a decoder 140 to a speaker 150. The decoder 140 may comprise a digital-to-analog converter or the like. The decoded data may then be played through the speaker 150 to be heard by the user.

The user may also direct voice into the microphone 145 of the mobile unit 106. The voice data passes through an encoder 135 and may be stored by the storage medium 130 prior to processing by the processor 125. The encoder 135 may comprise an analog-to-digital converter or the like. The processor 125 maintains two-way communication with the transceiver 125, and therefore the voice data may be sent from the mobile unit 106 to the base station 104.

Figure 4:
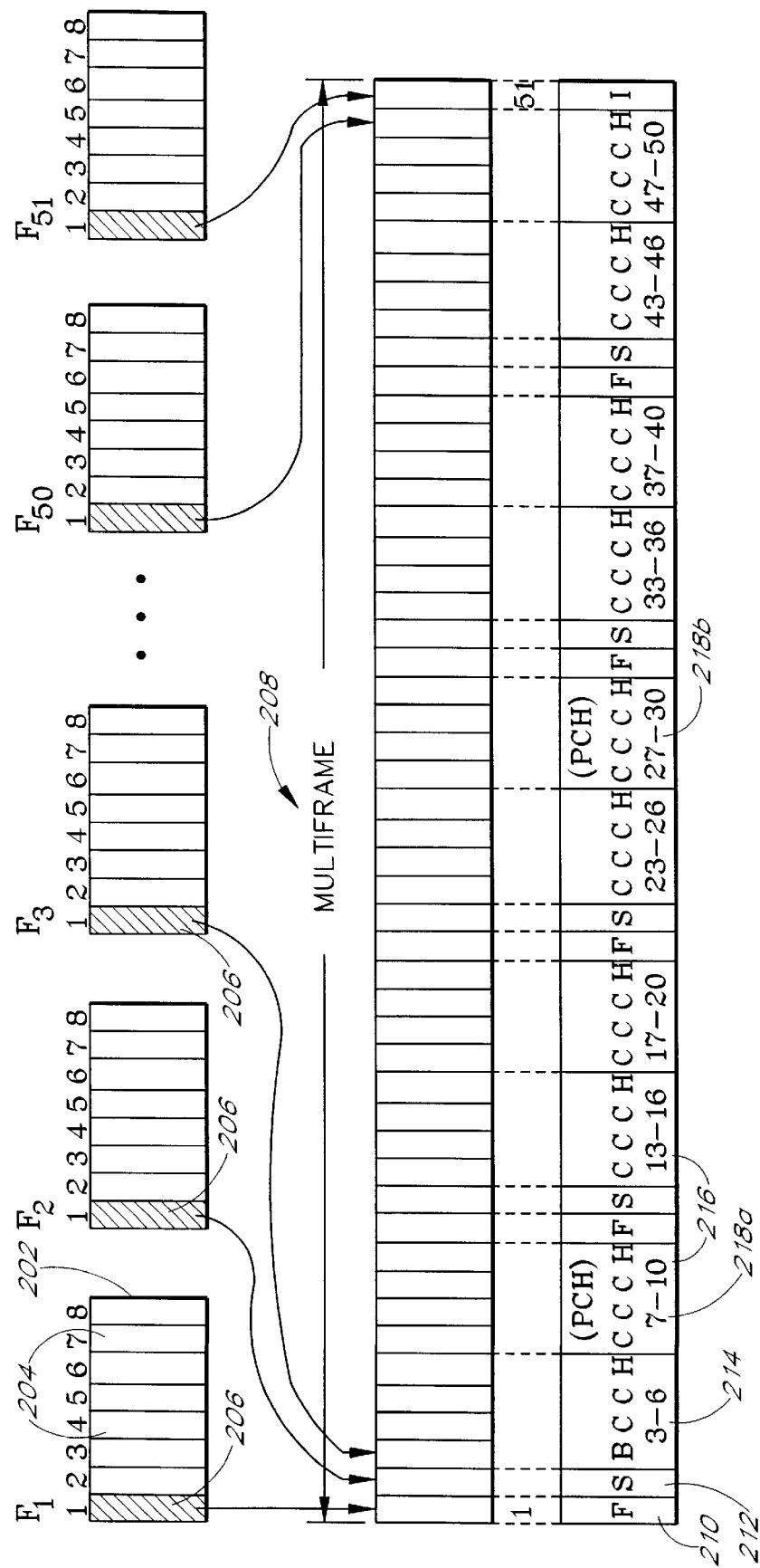
FIG. 4 illustrates one embodiment of a wireless communication signal data transmitted by a base station.

FIG. 4 illustrates wireless communication data transmitted by a base station 104 and structured in data frames, sometimes called time-division multiple access (TDMA) frames, according to the GSM standard. TDMA is a type of multiplexing where two or more channels of information are transmitted over the same link by allocating a different time interval ("slot" or "slice") for the transmission of each channel. That is, the channels take turns to use the link. Of course, the present invention is not limited to the GSM standard or TDMA frames, and may include systems using code-division multiple access, statistical time division multiplexing, spread spectrum, a single communications channel or the like. For ease of understanding, the present invention will be described with reference to a GSM based system.

The GSM specification provides eight time slots (or physical channels) in each 200 kHz radio channel. An entire data frame has a duration of 4.615 milliseconds. Each time slot has a time length of 577 microseconds (4,615 / 8=577). Because a mobile unit 106 may use only one time slot in any data frame, it must transmit information within the 577 microsecond time slot duration.

As shown in FIG. 4, a data frame 202 has eight time slots 204 (or physical channels). The time slots 204 carry bit-oriented control information, voice information or data. Generally, the first time slot of each frame 206 holds bit-oriented control information. Control information is used in a GSM-based system to broadcast synchronization information and system parameters, to notify mobile units 106 of pending telephone calls or page messages, and to grant mobile units 106 access to other physical channels.

The time slots carrying control information are formatted in groups of 51 time slots (i.e., the first time slot of each of 51 successive frames) referred to as a multiframe 208. Downlink information transmitted to a mobile unit 106 by a base station 104 is formatted in multiframes 208. In accordance with the GSM standard, a multiframe 208 may include four types of control information: (1) a frequency correction channel 210 which provides the mobile unit 106 with the frequency reference of the GSM system; (2) a synchronization channel 212 which supplies the mobile unit 106 with the key (or training sequence) needed to demodulate the information coming from the base station 104 and also contains a frame number, as well as the base transceiver station identity code; (3) a broadcast control channel 214 which informs the mobile unit 106 about specific system parameters it may need to identify the network or to gain access to the network, including location area code, operator identification, information on which frequencies of the neighboring cells may be found, different cell options, and access to other parameters; and (4) a common control channel 216 which supports the establishment of a link between a mobile unit 106 and a base station 104.

A common control channel 216 may have different uses. A common control channel 216 may be a paging message 218a or 218b, referred to collectively as paging messages 218. The paging messages 218 provide information indicating whether a telephone call is currently pending for a particular mobile unit 106. A common control channel 216 may also be an access grant channel through which a mobile unit 106 acquires information identifying which channel to use for communication needs.

The frequency correction channel 210 and the synchronization channel 212 each consist of bit-oriented data in a time slot. The broadcast control channel 214 uses four time slots to carry information. In addition, the common control channel 216 also uses four time slots to carry information. For example, a common control channel 216 used as a paging message 218 uses four time slots of bit-oriented data 220, each time slot 220 carrying 156.25 bits.

Figure 5:
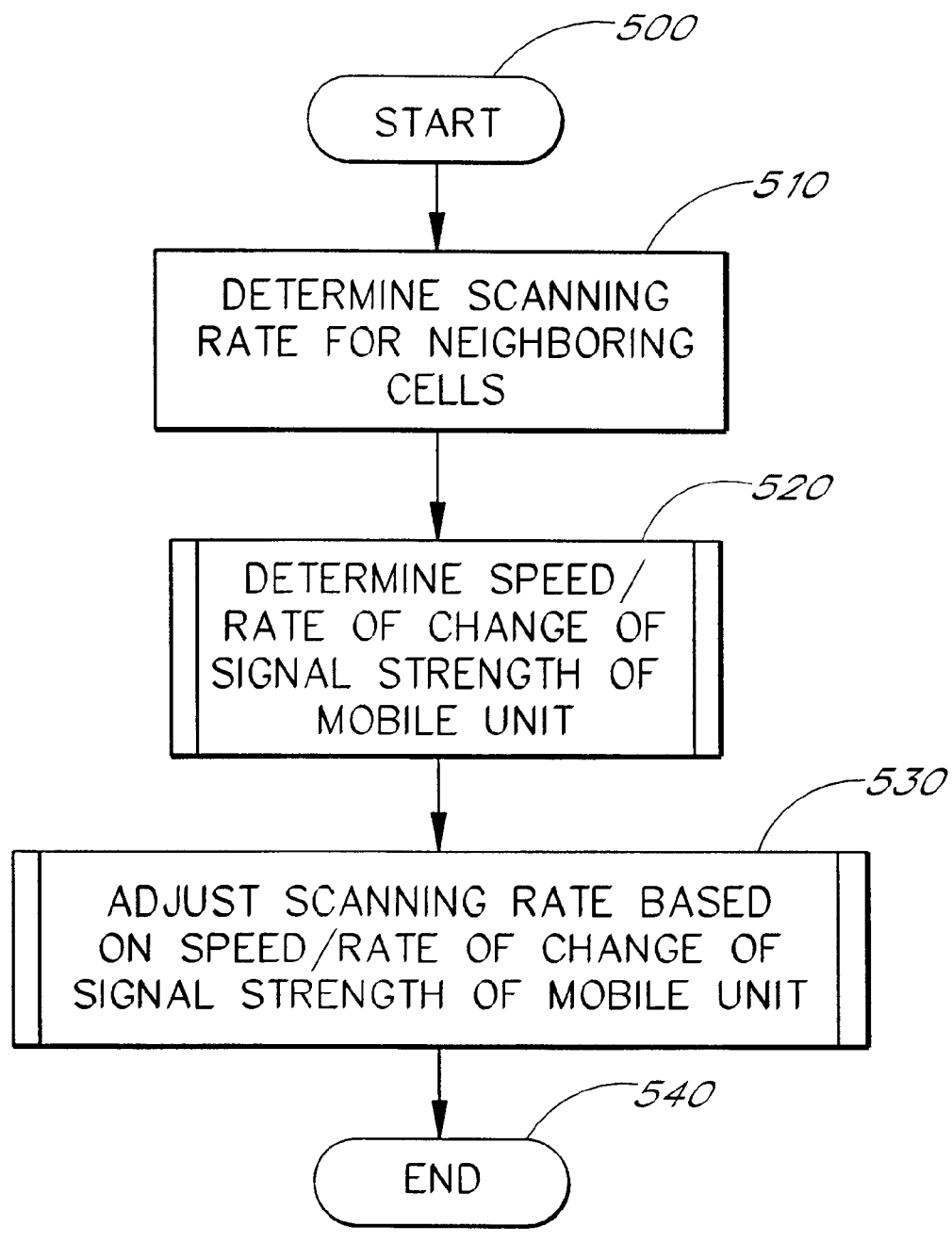
FIG. 5 illustrates one embodiment of the acts performed by a mobile unit to establish a scanning rate of neighboring cells.

The process of establishing a scanning rate for neighboring cells by a mobile unit 106 is illustrated in FIG. 5. The process is shown generally by flowchart 500. The mobile unit 106 initializes in a start state 505. Proceeding to state 510, the mobile unit 106 determines the default scanning rate for neighboring cells by obtaining this information from the base station 104. The default scanning rate is the rate prescribed by the service provider. This rate varies from system to system, but is generally on the order of once every 30 seconds. This means the mobile unit 106 scans each neighboring cell every 30 seconds. For example, if the mobile unit 106 has 6 neighboring cells, the mobile unit 106 scans a neighboring cell approximately every 5 seconds.

Proceeding to state 520, the mobile unit 106 determines the speed it is traveling through a cell 108 or the rate of change of the received signal strength. The speed determined by the mobile unit 106 may not be the actual speed of the mobile unit 106, but rather the relative speed the mobile unit 106 is traveling through a cell 108. For example, a mobile unit 106 traveling at 30 miles per hour directly through a cell 108 may have a higher relative speed than a mobile unit 106 traveling at 80 miles per hour up a hill near the center of the cell 108.

The mobile unit 106 may determine the speed or the rate of change of the received signal strength using several techniques. The speed a mobile unit 106 travels through a cell 108 may be determined using a Global Positioning System (GPS). Such systems are well known and can identify the location of an object. The speed of a mobile unit 106 may be obtained using GPS by taking several readings and calculating the change in location over time.

Figure 6:
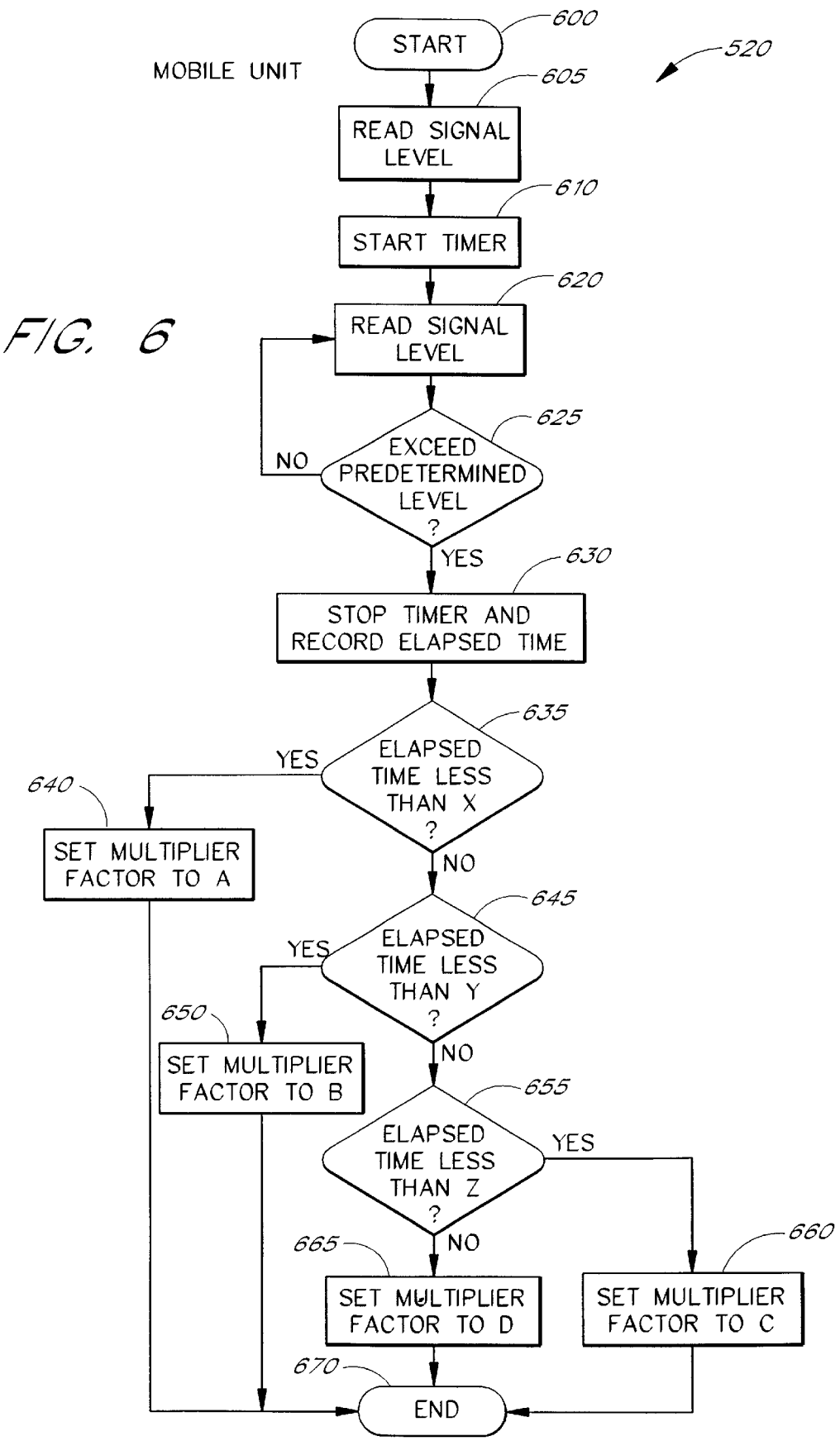
FIG. 6 illustrates acts performed by a mobile unit to determine the change of signal strength according to one embodiment of the invention.

FIG. 6 illustrates the process according to one embodiment used to determine the speed the mobile unit 106 is traveling through a cell 108 or rate of change of the received signal strength of state 520. The process begins at start state 600. Proceeding to state 605, the mobile unit 106 records the level or quality of the signal received. Because many factors may influence the signal quality each time it is measured, one embodiment averages several measurements of the signal quality detected by the mobile unit 106.

The mobile unit 106 uses a variety of indicators to determine signal quality. Among these indicators is a bit error rate, a receiver quality indicator (RX Quality), and a receive signal strength indicator (RSSI), known in the GSM and the digital cellular embodiment as RX Level. The mobile unit 106 uses these indicators to determine the signal quality.

In particular, the bit error rate is the number of erroneous bits in a data transmission. The RX Quality is a value assigned by the network indicating the quality of the received signal based upon the bit error rate. The RX Quality figure provides a mobile unit 106 with an expected measurement accuracy. The mobile unit 106 uses the RX Quality to determine the overall potential for error. The values assigned for RX Quality according to the GSM standard based upon the bit error rate are presented in Table 1.

TABLE 1

| RX Quality | Corresponding Bit Error Rate (%) | Range of Actual Bit Error Rate (%) | Expected MU-Reporting-Accuracy Probability (%) |
| --- | --- | --- | --- |
| 0 | Below 0.2 | Below 0.1 | 90 |
| 1 | 0.2 to 0.4 | 0.26 to 0.30 | 75 |
| 2 | 0.4 to 0.8 | 0.51 to 0.64 | 85 |
| 3 | 0.8 to 1.6 | 1.0 to 1.3 | 90 |
| 4 | 1.6 to 3.2 | 1.9 to 2.7 | 90 |
| 5 | 3.2 to 6.4 | 3.8 to 5.4 | 95 |
| 6 | 6.4 to 12.8 | 7.6 to 11.0 | 95 |
| 7 | Above 12.8 | Above 15 | 95 |

Another measurement that may be used by the mobile unit 106 is RX Level (also known as RSSI in analog systems). RX Level provides a known value based upon the measured strength of the signal at the mobile unit 106. A stronger signal at the mobile unit 106 indicates less likelihood for error. Table 2 provides values for RX Level based upon the signal strength at the mobile unit 106. Each specific value for RX Level correlates to the strength of the signal (in measured decibels (dBm)) at the mobile unit (MU) 106 receiver.

TABLE 2

| RX Level | Level at MU Receiver (dBm) |
| --- | --- |
| 0 | Less than −110 |
| 1 | −110 to −109 |
| 2 | −109 to −108 |
| ... | ... |
| ... | ... |
| 62 | −49 to −48 |
| 63 | above −48 |

Proceeding to state 610, the mobile unit 106 begins a timer. The timer may be included in the processor 125 of the mobile unit 106 as shown in FIG. 3. The timer may also be provided by the base station 104. Alternatively, instead of starting a timer, the mobile unit 106 may record a first time from a clock. This enables the mobile unit 16 to calculate the elapsed time after recording a second time from the clock.

Proceeding to state 620, the mobile unit 106 again reads the signal level. Proceeding to state 625, the mobile unit 106 determines if the signal level read in state 620 exceeds a predetermined level. This may be, for example, higher than the signal read in state 605. The mobile unit 106 may also look for a specific increase in one of the indicators, such as an increase in RX Level. The amount of change needed may be set upon initialization of the mobile unit 106 or may be dynamically adjusted by the processor 125 based upon the previous rate of change of signal strength measured. This may be, for example, a 6 dB increase in the signal strength or an increase in RX Level by 5. If the level is not exceeded, the mobile unit 106 proceeds along the NO branch back to state 620. In state 620, the mobile unit 106 again reads the signal level and proceeds to state 625. The mobile unit 106 continues to read the signal level until the predetermined change is exceeded.

After the signal strength measured in state 620 exceeds the predetermined level, the mobile unit 106 proceeds along the YES branch to state 630. In state 630, the mobile unit 106 stops the timer and records the stop time or the elapsed time, depending on whether a clock or timer is used. If a clock is used, the mobile unit 106 determines the elapsed time by recording the start time and stop time, then subtracting the start time from the stop time.

Proceeding to state 635, the mobile unit 106 determines if the elapsed time is less then a first predetermined period of time X. The amount of the first predetermined period of time X may be programmed into the mobile unit 106, established upon initialization of the mobile unit 106, or may be dynamically adjusted by the processor 125. The value of X may vary and is effected by the amount of signal change required in state 625. In one embodiment, the value of X is 2 seconds. Of course, the value given in this one embodiment is provided as only an example and one of skill in the art may assign a variety of alternative values.

If the elapsed time is less then X, the mobile unit proceeds along the YES branch to state 640. In state 640, the mobile unit 106 sets the multiplier factor to A. The multiplier factor is a multiple that the mobile unit 106 uses to modify the scanning rate for neighboring cells. The value to assign to A could vary, and may be programmed into the mobile unit 106, established upon initialization of the mobile unit 106, or may be dynamically adjusted by the processor 125. In one embodiment of the invention, the value of A is equal to 1. Of course, the value given in this one embodiment is provided as only an example and one of skill in the art may assign a variety of alternative values. After setting the multiplier factor to a value of A, the mobile unit 106 proceeds to end state 670.

Returning to state 635, if the elapsed time is not less then X, the mobile unit proceeds along the NO branch to state 645. In state 645, the mobile unit 106 determines if the elapsed time is less then a second predetermined period of time Y. The amount of the second predetermined period of time Y may be established in the same manner as the first predetermined period of time X, by programming into the mobile unit 106, establishing upon initialization of the mobile unit 106, or dynamically adjusting by the processor 125. In one embodiment, the value of Y is 4 seconds. Of course, the value given in this one embodiment is provided as only an example and one of skill in the art may assign a variety of alternative values.

If the elapsed time is less then Y, the mobile unit 106 proceeds along the YES branch to state 650. In state 650, the mobile unit 106 sets the multiplier factor to B. In one embodiment of the invention, the value of B is equal to 2. Of course, the value given in this one embodiment is provided as only an example and one of skill in the art may assign a variety of alternative values. After setting the multiplier factor to a value of B, the mobile unit 106 proceeds to end state 670.

Returning to state 645, if the elapsed time is not less then Y, the mobile unit proceeds along the NO branch to state 655. In state 655, the mobile unit 106 determines if the elapsed time is less then a third predetermined period of time Z. The value of the third predetermined period of time Z is determined in the same manner as the periods of time X and Y. In one embodiment, the value of Z is 8 seconds. Of course, the value given in this one embodiment is provided as only an example and one of skill in the art may assign a variety of alternative values.

If the elapsed time is less then Z, the mobile unit 106 proceeds along the YES branch to state 660. In state 660, the mobile unit 106 sets the multiplier factor to C. In one embodiment of the invention, the value of C is equal to 4. Of course, the value given in this one embodiment is provided as only an example and one of skill in the art may assign a variety of alternative values. After setting the multiplier factor to a value of C, the mobile unit 106 proceeds to end state 670.

Returning to state 655, if the elapsed time is not less then Y, the mobile unit proceeds along the NO branch to state 665. In state 665, the mobile unit 106 sets the multiplier factor to D. In one embodiment of the invention, the value of D is equal to 8. Of course, the value given in this one embodiment is provided as only an example and one of skill in the art may assign a variety of alternative values. After setting the multiplier factor to a value of D, the mobile unit 106 proceeds to end state 670. Of course, the number of predetermined periods of time and multiplier factors may vary depending on how precise of a change is desired.

The number of stages of elapsed time, represented by states 635, 645, and 655 may vary depending upon the sensitivity desired. In the above example, three levels of sensitivity are used, resulting in four possible multipliers. If a more precise rate of change of signal strength is desired, the difference between each amount of time may be decreased. For example, eight stages may be used, with the elapsed time being for each stage having a small one second increase.

In an example of the present invention using the process of FIG. 6, a mobile unit 106 moves slowly through a cell 108. Because the slow moving mobile unit 106 changes cells 108 less often, there is less need to frequently scan each neighboring cell 108. In this circumstance, the mobile unit 106 begins at start state 600 and proceeds to state 605 to read the current signal level from its servicing base station 104. Proceeding to state 610, the mobile unit 106 starts a timer. Proceeding to state 620, the mobile unit 106 receives subsequent signals from the base station 104 and checks the signal level. Proceeding to state 625, the mobile unit 106 checks if the signal exceeds a predetermined level. Once the signal level reaches a predetermined level, the mobile unit 106 proceeds along the YES branch of state 625 and stops the timer and records the elapsed time according to state 630. In this case, because the mobile unit 106 is moving slowly through the cell 104, it is likely to take a long time for the signal level to change, say 15 seconds. Proceeding to state 635, the mobile unit 106 checks if the elapsed time is less than the first predetermined period of time X, which is set at 2 seconds. In this example, because 15 seconds is longer than 2 seconds, the mobile unit 106 proceeds along the NO branch of state 635 to state 645. In state 645, the mobile unit 106 checks if the elapsed time of 15 seconds is less than the second predetermined period of time Y, set at 4 seconds. Again, in this example, 15 seconds is longer than Y so the mobile unit 106 proceeds along the NO branch of state 645 to state 655. In state 655, the mobile unit 106 checks if the elapsed time is less than the third predetermined period of time Z, set at 8 seconds. Again, in this example, 15 seconds is longer than Z, so the mobile unit 106 proceeds along the NO branch of state 655 to state 665. In state 665, the multiplier factor is set to a level D, in this case 8. Using this multiplier factor, the slow moving mobile unit 106 will change the scanning rate for neighboring cells 108 from say every 30 seconds to every 240 seconds. Applying the multiplier factor to the scanning rate will be described below. By scanning each neighboring cell only every 240 seconds, the mobile unit 106 activates less often and battery power is conserved.

Figure 7:
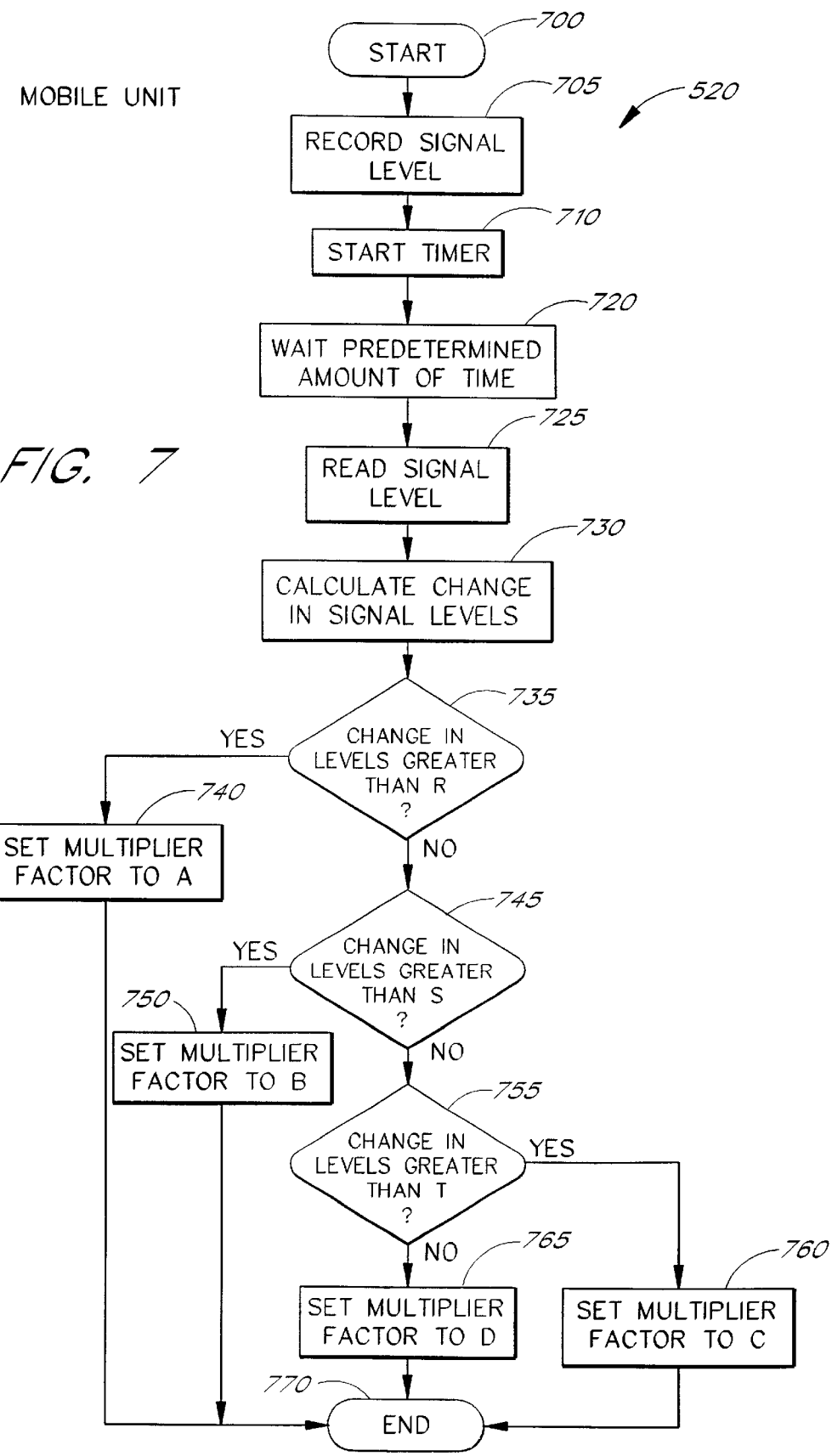
FIG. 7 illustrates acts performed by a mobile unit to determine the change of signal strength according to one embodiment of the invention.

FIG. 7 illustrates the process according to another technique used to perform the activities indicated by state 520 to determine the rate of change of the received signal strength. In FIG. 6, the mobile unit 106 determined the amount of time required for the signal strength to increase a set amount. An alternative approach illustrated in FIG. 7 determines the actual change in signal strength after a predetermined period of time. The process begins at start state 700. Proceeding to state 705, the mobile unit 106 records the level of the signal received. The mobile unit 106 may use a variety of indicators to determine signal quality as described above. These indicators include a bit error rate, a receiver quality indicator (RX Quality), a receive signal strength indicator (RSSI), or a RX Level.

Proceeding to state 710, the mobile unit 106 begins a timer or records a start time from a clock. The timer or clock may be included in the processor 125 of the mobile unit 106 as shown in FIG. 3, or may be provided by the base station 104.

Proceeding to state 720, the mobile unit 106 again reads the timer or clock to determine the amount of time elapsed. The amount of time elapsed in state 720 is compared to determine if it exceeds a predetermined level. This may be, for example, 5 seconds. The amount of elapsed time needed may be set upon initialization of the mobile unit 106 or may be dynamically adjusted by the processor 125 based upon the previous rate of change of signal strength measured. The mobile unit 106 remains in state 620 until the predetermined amount of time elapses.

Proceeding to state 725, the mobile unit 106 records the current signal level. As stated above, this may be a direct reading of the signal strength in a unit like decibels, or the mobile unit 106 may use any of the available indicators to determine the strength of the signal.

Proceeding to state 730, the mobile unit 106 calculates the change in the signal levels measured in state 705 and state 730. The change in the signal levels may be recorded in the storage medium 130 for future use.

Proceeding to state 735, the mobile unit 106 determines if the change in the levels is greater then a first predetermined change R. The amount of the first predetermined change R may be programmed into the mobile unit 106 by the user, established upon initialization of the mobile unit 106, or may be dynamically adjusted by the processor 125. The value of R may vary and is effected by the amount of elapsed time required in state 720. In one embodiment, the value of R is 6 decibels. Of course, the value given in this one embodiment is provided as only an example and one of skill in the art may assign a variety of alternative values.

If the change in levels is greater then R, the mobile unit 106 proceeds along the YES branch to state 740. In state 740, the mobile unit 106 sets the multiplier factor to A. The multiplier factor is an amount that the scanning rate will eventually modify the scanning rate for neighboring cells. The value to assign to A could vary, and may be programmed into the mobile unit 106, established upon initialization of the mobile unit 106, or may be dynamically adjusted by the processor 125. In one embodiment of the invention, the value of A is equal to 1. Of course, the value given in this one embodiment is provided as only an example and one of skill in the art may assign a variety of alternative values. After setting the multiplier factor to a value of A, the mobile unit 106 proceeds to end state 770.

Returning to state 735, if the change in levels is not greater then R, the mobile unit proceeds along the NO branch to state 745. In state 745, the mobile unit 106 determines if the change in levels is greater then a second predetermined change S. The amount of the second predetermined change S may be established in the same manner as the first predetermined change R, by programming into the mobile unit 106 by the user, establishing upon initialization of the mobile unit 106, or dynamically adjusting by the processor 125. In one embodiment, the value of S is 4 decibels. Of course, the value given in this one embodiment is provided as only an example and one of skill in the art may assign a variety of alternative values.

If the change in levels is greater then S, the mobile unit 106 proceeds along the YES branch to state 750. In state 750, the mobile unit 106 sets the multiplier factor to B. In one embodiment of the invention, the value of B is equal to 2. Of course, the value given in this one embodiment is provided as only an example and one of skill in the art may assign a variety of alternative values. After setting the multiplier factor to a value of B, the mobile unit 106 proceeds to end state 770.

Returning to state 745, if the change in levels is not greater then S, the mobile unit proceeds along the NO branch to state 755. In state 755, the mobile unit 106 determines if the change in levels is greater then a third predetermined change T. The value of the third predetermined change T is determined in the same manner as the changes in levels R and S. In one embodiment, the value of T is 2 decibels. Of course, the value given in this one embodiment is provided as only an example and one of skill in the art may assign a variety of alternative values.

If the change in levels is greater then T, the mobile unit 106 proceeds along the YES branch to state 760. In state 760, the mobile unit 106 sets the multiplier factor to C. In one embodiment of the invention, the value of C is equal to 4. Of course, the value given in this one embodiment is provided as only an example and one of skill in the art may assign a variety of alternative values. After setting the multiplier factor to a value of C, the mobile unit 106 proceeds to end state 770.

Returning to state 755, if the change in levels is not greater then T, the mobile unit proceeds along the NO branch to state 765. In state 765, the mobile unit 106 sets the multiplier factor to D. In one embodiment of the invention, the value of D is equal to 8. Of course, the value given in this one embodiment is provided as only an example and one of skill in the art may assign a variety of alternative values. After setting the multiplier factor to a value of D, the mobile unit 106 proceeds to end state 770. Of course, the number of predetermined change stages and multiplier factors may vary depending on how precise of a change is desired.

The number of stages of signal level changes, represented by states 735, 745, and 755 may vary depending upon the sensitivity desired. In the above example, three levels of sensitivity are used, resulting in four possible multipliers. If a more precise rate of change of signal strength is desired, the difference between each change in signal levels may be decreased. For example, six stages may be used, with the change in level between each stage being only one decibel.

In one example of the present invention using the process of FIG. 7, a mobile unit 106 moves at an average speed through a cell 108. The mobile unit 106 may not change the scanning rate of each neighboring cell 108 as much as the slow moving mobile unit 106 described above. In this circumstance, the mobile unit 106 begins at start state 700 and proceeds to state 705 to read the current signal level from its servicing base station 104. Proceeding to state 710, the mobile unit starts a timer. Proceeding to state 720, the mobile waits a predetermined period of time. Proceeding to state 725, the mobile unit 106 receives a subsequent signal from the base station 104 and records the subsequent signal level. Proceeding to state 730, the mobile unit 106 calculates the change in the two signal levels. In this case, because the mobile unit 106 is moving at an average speed through the cell 104, it is likely for the signal level to change moderately, say 5 decibels. Proceeding to state 735, the mobile unit 106 checks if the change in levels is greater than the first predetermined change R, or 6 decibels in this example. In this example, because the change in levels of 5 decibels is less than the first predetermined change of 6 decibels, the mobile unit 106 proceeds along the NO branch of state 735 to state 745. In state 745, the mobile unit 106 checks if the change in levels is greater than the second predetermined change S, or 4 decibels in this example. Because the measured signal change of 5 decibels is greater than the second predetermined change S of 4 decibels, the mobile unit 106 proceeds along the YES branch of state 745 to state 750. In state 750, the multiplier factor is set to a level B, in this case 2. Using this multiplier factor, the average moving mobile unit 106 will change the scanning rate for neighboring cells 108 from every 30 seconds to every 60 seconds. Applying the multiplier factor to the scanning rate will be described below.

Figure 8:
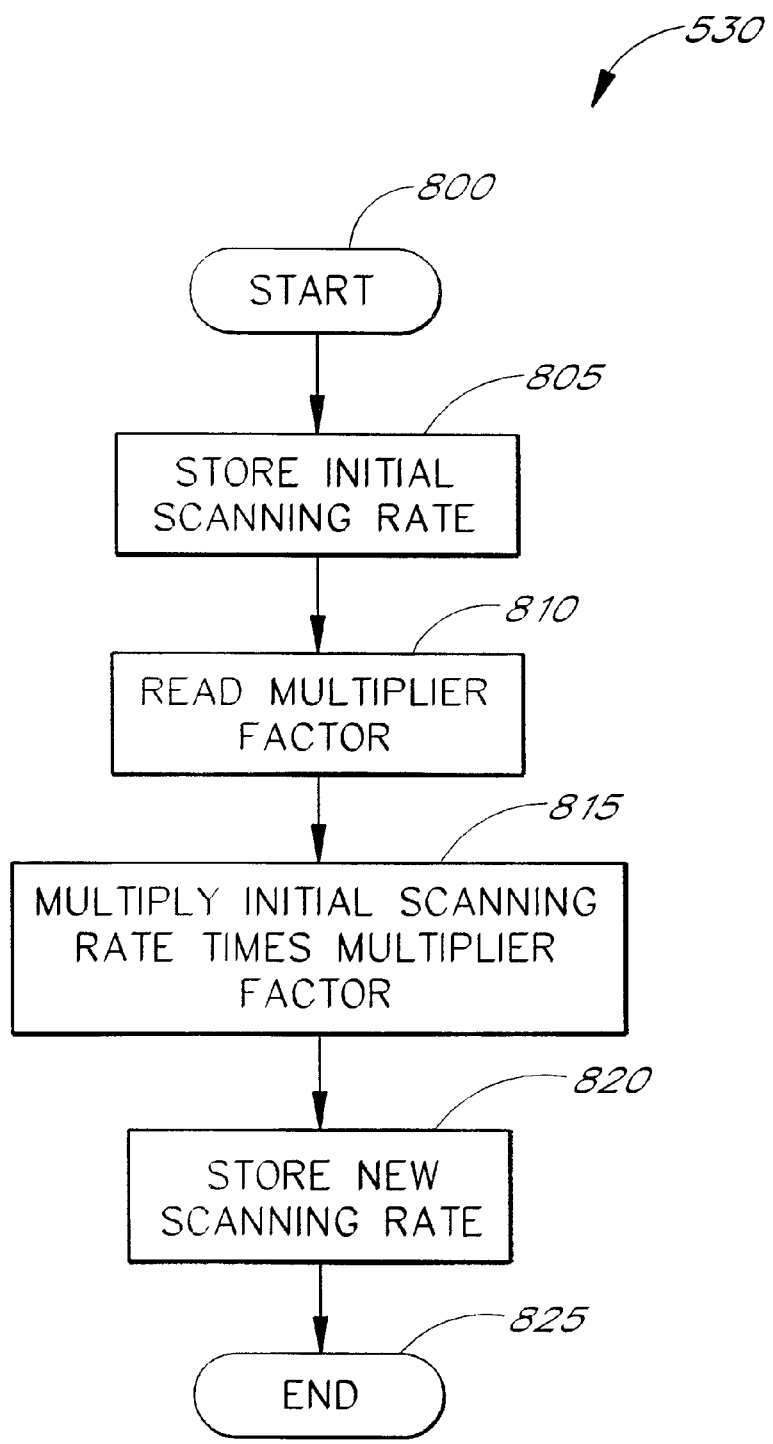
FIG. 8 illustrates acts performed by a mobile unit to adjust the scanning rate of neighboring cells according to one embodiment of the invention.

Returning to FIG. 5, the mobile unit 106 proceeds to state 530 to adjust the scanning rate of neighboring cells based upon the speed or rate of change of signal strength measurement obtained in state 520. FIG. 8 illustrates the process according to one technique used to perform the activities indicated by state 530 to adjust the scanning rate of neighboring cells. The process begins at start state 800. Proceeding to state 805, the mobile unit 106 records the current initial scanning rate as prescribed by the system provider.

Proceeding to state 810, the mobile unit 106 reads the multiplier factor obtained from state 520 in FIG. 5. The multiplier factor may be known by the processor 125 or retrieved from the storage medium 130.

Proceeding to state 815, the mobile unit 106 multiplies the initial rate times the multiplier factor to obtain a new scanning rate. For example, if the initial scanning was one every 30 seconds, and the multiplier factor is 2, the new scanning rate is once every 60 seconds.

Proceeding to state 820, the mobile unit 106 stores the new scanning rate and begins operation under the new scanning rate. The mobile unit 106 then proceeds to end state 825 and returns to FIG. 5. After the mobile unit 106 adjusts the scanning rate in state 530, the mobile unit 106 proceeds to end state 540.

In another example of the present invention using the process of FIG. 7, a mobile unit 106 moves quickly through a cell 108. The quick moving mobile unit 106 may not change the scanning rate of each neighboring cell 108. In this circumstance, the mobile unit 106 begins at start state 700 and proceeds to state 705 to read the current signal level from its servicing base station 104. Proceeding to state 710, the mobile unit starts a timer. Proceeding to state 720, the mobile waits a predetermined period of time. Proceeding to state 725, the mobile unit 106 receives a subsequent signal from the base station 104 and records the subsequent signal level. Proceeding to state 730, the mobile unit 106 calculates the change in the two signal levels. In this case, because the mobile unit 106 is moving at a fast speed through the cell 104, it is likely for the change in signal level to be high, say 9 decibels. Proceeding to state 735, the mobile unit 106 checks if the change in levels is greater than the first predetermined change R, or 6 decibels in this example. Because the measured signal change of 9 decibels is greater than the first predetermined change R of 6 decibels, the mobile unit proceeds along the YES branch of state 735 to state 740. In state 740, the multiplier factor is set to a level A, in this case 1. Using this multiplier factor, the average moving mobile unit 106 does not change the scanning rate for neighboring cells 108 and it remains at every 30 seconds.

The present invention may also be used to increase the overall speed a mobile unit 106 may travel through a cell 108. Cellular systems are limited to serving mobile units 106 traveling less than a set speed, currently on the order of 200 miles per hour. Generally, this speed is high enough for the average mobile unit 106, either a car or pedestrian that will never approach the maximum speed. However, there exists the possibility that some mobile units 106, for example a rider on a high speed bullet train, may exceed this speed. In these cases, the multiplier factor can be less than one, causing an increase in the scanning rate of neighboring cells. This allows the mobile unit 106 to travel at high speeds through the cellular network using rapid handovers.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of saving power in a mobile unit comprising the acts of:

measuring received signal strengths based on communications between the mobile unit and a base station;

determining a multiplier factor based on a rate of change of the received signal strengths over time;

multiplying an existing scanning rate for neighboring cells by the multiplier factor to obtain a new scanning rate; and scanning the neighboring cells at the new scanning rate.

2. The method of claim 1, further comprising the act of obtaining the existing scanning rate for neighboring cells from the base station.

3. The method of claim 1, wherein determination of the multiplier factor comprises of the following steps:

recording an initial received signal strength;

starting a timer;

reading the received signal strength until a predetermined change is exceeded;

stopping the timer and determining an elapsed time; and setting the multiplier factor based on the elapsed time.

4. The method of claim 3, wherein the predetermined change is dynamically adjusted based upon a previous rate of change of the received signal strengths over time.

5. The method of claim 1, wherein determination of the multiplier factor comprises of the following steps:

recording a first received signal strength;

reading a clock until a predetermined amount of time elapses;

recording a second received signal strength and calculating a signal level change between the first received signal strength and the second received signal strength; and setting the multiplier factor based on the signal level change.

6. A method of adjusting a scanning rate of neighboring cells in a mobile unit comprising the acts of:

storing an initial scanning rate;

reading a multiplier factor stored in the mobile unit, wherein the multiplier factor is determined by a rate of change of received signal strengths based on communications between the mobile unit and a base station;

multiplying the initial scanning rate by the multiplier factor to obtain a new scanning rate; and storing the new scanning rate in the mobile unit which operates under the new scanning rate.

7. The method of claim 3, wherein the initial scanning rate is prescribed by a system provider.

\* \* \* \* \*